United States Patent [19]
Straeter

[11] 3,939,847
[45] Feb. 24, 1976

[54] COMBINE WITH IMPROVED FEED PLATE

[75] Inventor: James E. Straeter, Bresse, Ill.

[73] Assignee: Sperry Rand Corporation, New Holland, Pa.

[22] Filed: Mar. 24, 1975

[21] Appl. No.: 561,406

[52] U.S. Cl. .............................. 130/27 T; 56/14.6
[51] Int. Cl.² .......................................... A01F 7/06
[58] Field of Search............ 56/14.5, 14.6, 122–125; 130/27 R, 27 H, 27 HF, 27 HA, 27 J, 27 JT, 27 K, 27 L, 27 P, 27 Q, 27 S, 27 T

[56] References Cited
UNITED STATES PATENTS

| | | | |
|---|---|---|---|
| 3,626,472 | 12/1971 | Rowland-Hill | 130/27 T |
| 3,664,100 | 5/1972 | Rowland-Hill | 56/14.6 |
| 3,756,248 | 9/1973 | Mathews | 130/27 JT |
| 3,848,609 | 11/1974 | Mortier et al. | 130/27 T |

Primary Examiner—Russell R. Kinsey
Attorney, Agent, or Firm—John R. Flanagan; Frank A. Seemar; Joseph A. Brown

[57] ABSTRACT

In a combine having a header to cut crop material and an elevator to deliver the cut crop material to auger means in an undershot manner for feeding the same to threshing rotors of an axial flow combine, there is provided an improved transition or feed plate between the upper end of the elevator and the forward end of the rotor means to postpone or delay the discharge of crop material by the rear discharging portion of the elevator until leading portions of the discharging crop material are at least partially engaged by the auger means whereby more positive control is maintained over the transfer of crop material from the elevator to the auger feeding means.

10 Claims, 3 Drawing Figures

COMBINE WITH IMPROVED FEED PLATE

CROSS REFERENCE TO RELATED APPLICATIONS

This application is one of a limited series of applications co-pending herewith and respectively pertaining to different improvemnt inventions applicable generally to an axial flow combine of the type, for example, shown and described in U.S. Pat. No. 3,664,100, dated May 23, 1972, and assigned to the same assignee as the instant invention.

BACKGROUND OF THE INVENTION

Combines for harvesting grain crops such as wheat, barley, oats and the like have been known for many years. The use of combines to harvest grain crops of this type has permitted the efficient production of said type grain grown on very extensive fields with minimum use of labor and consumption of time. Progressively, combines have been developed capable of harvesting wider swaths of grain than previously harvested by earlier combines and this has resulted in the combines being larger and more powerful, as well as more expensive than such earlier combines.

The increase in cost of such aforementioned improved combines also has led to attempts to develop combines capable of harvesting a wider variety of seed or grain crops than capable of being handled by earlier combines, adapting such combines for said harvesting of a wider variety of crops however being made possible by minimum requirements of exchanging certain elements of the combine for others, especially the headers and elevators. For example, harvesting corn requires a different type of header to cut and elevate the corn stalks and ears to the threshing mechanism than is required for harvesting wheat, oats, and similar headed stalk crops. Further, harvesting bean or other pod-like crops requires different header structures from those used to harvest corn and wheat-like crops for example.

With respect to the threshing and separating mechanism of the combine however, it is preferred that the same be adapted to thresh and separate substantially all types of seed type crops for purposes of threshing and separating the seed from the stalks, vines and other waste material, the latter being discharged upon the field as the combine moves along the same in a harvesting operation.

It readily can be appreciated that adapting a combine to harvest, thresh and separate a wide variety of crop materials of the type referred to above makes it necessary that the combine handle a substantial variety of different types of crops varying as to bulk, moisture content, toughness of the stalk or vine included in the crops and otherwise. Preferably, by adjusting the spacings between the rotors and concaves in threshing and separating areas of the combine, this part of the apparatus has been developed successfully and comprises, for example, the subject matter of the following prior patents, all of which are assigned to the assignee of the present invention.

| | |
|---|---|
| 3,626,472 | Dec. 7, 1971 |
| 3,645,270 | Feb. 29, 1972 |
| 3,664,100 | May 23, 1972 |

-continued

| | |
|---|---|
| 3,794,047 | Feb. 26, 1975 |

Notwithstanding the capabilities of the inventions comprising the subject matter of the foregoing patents, it now has been found that additional features render such universal type combines even more efficient and effective. For example, referring to said aforementioned U.S. Pat. Nos. 3,626,472 and 3,794,047 there is a ramp, transition or feed plate which extends between the upper end of the bottom plate of the elevator, upwardly and rearwardly toward the forward end of the rotor of the threshing and separating mechanism. Said combines are of the type in which the lower span of the elevator feeds the crop material upwardly and rearwardly toward the forward end of the rotors, delivering the same to the rotors in a so-called undershot manner. The rotors conventionally employ an auger at the forward end thereof which is rotated by power means in a direction to feed the crop material inwardly to the rotors for engagement by said rotors and concaves associated therewith in the combine which is of the axial flow type, the same being the type to which the present invention pertains.

The ramp plate employed heretofore, as illustrated in aforementioned U.S. Pat. Nos. 3,626,472 and 3,794,047, relies on the crop material being delivered by the elevator to the lower end of the ramp to push the previously-delivered crop material upwardly along the ramp and into the working paths of the augers.

However, depending upon the nature and character of the crop 30 and especially the toughness thereof, moisture content, bulk and the like, for example, crop material having green or unripened stems, stalks or vines, such crop material tends to drag and build-up on the lower end of the ramp adjacent the rear end of the elevator and impede the flow of incoming material from the elevator. This is believed to be caused by the loss of positive control over the movement of the crop material once it exits from the elevator due to the particular configuration and positional relationship of the aforementioned ramp to the discharge end of the elevator and the forward end of the augers.

SUMMARY OF THE INVENTION

The present invention renders an axial flow combine capable of accommodating a wide variety of different types of crops, such as those varying in bulk, moisture content and the like, by providing more continuous positive control over movement of the crop material during transfer thereof from the elevator to the infeeding augers of the axially arranged threshing and separating units. The maintenance of such degree of control provides more even transfer of crop material which substantially eliminates plugging of the elevator and augers and thereby results in less damage to the crop material and less stress on the drive components of the combine.

The type of axial flow combine to which the present invention pertains, has at least one axially arranged threshing and separating unit which includes elements arranged for coaction together to thresh and separate crop material and feeding means forwardly thereof having peripherally-arranged crop material engaging structure and being operable for feeding crop material to the threshing and separating elements. The combine further has means for elevating crop material from the field to the feeding means, which means is disposed generally forwardly of the threshing and separating unit. The elevating means includes a bottom wall inclined upward and rearward and having a rear terminal end located in a position spaced below a forward end of the engaging structure of the feeding means. Also, the elevating means includes operable means disposed above the bottom wall and having a rear discharging portion extending upwardly beyond the terminal end of the bottom wall to adjacent the forward end of the engaging structure for conveying crop material rearwardly along the bottom wall to a discharge location above the terminal end thereof and spaced below the forward end of the engaging structure of the feeding means.

The present invention broadly relates to such type of axial flow combine in combination with improved feed ramp means for guiding crop material from the elevating means of the combine to feeding means and onto the threshing and separating elements thereof.

The improved feed ramp means comprises a forward portion which extends generally longitudinally from proximate the terminal end of the elevating means to rearwardly of and in close proximity to the lower boundary of the working area of the forward end of the engaging structure of the feeding means. The forward feed ramp means portion together with the discharging portion of the conveying means and the forward end of the engaging structure of the feeding means defines an upward and rearward inclined forward passageway for crop material from the terminal end of the bottom wall to the engaging structure. The forward feed ramp means portion defines the lower boundary of the forward inclined passageway and is adapted to guide crop material from the terminal end of the bottom way through the forward inclined passageway upon operation of the conveying means so as to postpone or delay the discharge of the crop material by the discharging portion of the conveying means until leading portions of the discharging crop material are at least partially engaged by the forward end of the engaging structure of the feeding means. Preferably, the forward feed ramp means portion is longitudinally aligned with, and forms an upward and rearward inclined extension of, the bottom wall from the terminal end thereof.

The improved feed ramp means further comprises a rear portion which is spaced below the engaging structure of the feeding means and extends generally longitudinally rearwardly from a forward edge which merges from an upper end of the forward feed ramp means portion to adjacent the threshing and separating elements, the rear feed ramp means portion together with the engaging structure of the feeding means defining a rear passageway for crop material to the threshing and separating elements. The rear feed ramp means portion defines the lower boundary of the rear passageway and is adapted to guide crop material through the rear passageway upon operation of the feeding means.

Still further, preferably, the forward and rear portions of the feed ramp means are in the form of separate structural elements and yieldable means is interposed between the upper end and forward edge of the respective portions at the location of merger therebetween to provide a sealed relationship at such location.

Also, the forward feed ramp means portion is pivotally supported at a lower end adjacent the terminal end of the bottom wall of the elevating means and spring means is provided for engaging the forward feed ramp means portion and biasing the upper end thereof toward the forward edge of the rear feed ramp means portion to maintain the sealed relationship therebetween.

The advantages and attainments of the axial flow combine incorporating the present invention will become apparent to those skilled in the art upon a reading of the following detailed description when taken in conjunction with the drawings in which there is shown and described a preferred or illustrative embodiment of the invention.

BRIEF DESCRIPTIONN OF THE DRAWINGS

In the course of the following detailed description reference will be frequently made to the attached drawings in which:

FIG. 1 is a side elevational view of an exemplary combine of the axial flow type to which the present invention pertains, with a part thereof being broken away to illustrate details of the interior thereof;

FIG. 2 is a fragmentary vertical sectional view of the portion of the combine in the area which is broken away in FIG. 1, the same being illustrated on a substantially larger scale than that of FIG. 1 and showing details of the feed ramp or transition plate comprising the improvement of the present invention; and FIG. 3 is a fragmentary front elevational view partially showing details of the portion of the combine which is illustrated in FIG. 2, as seen along line 3—3 of FIG. 2.

DETAILED DESCRIPTION OF THE PREFERRED EMBODIMENT

In the following description, right hand and left hand references are determined by standing at the rear of the combine and facing in the direction of forward travel. Also, in the following description, it is to be understood that such terms as "forward," "left," "upwardly," etc., are words of convenience and are not to be construed as limiting terms.

THE AXIAL FLOW COMBINE

Figure 1:
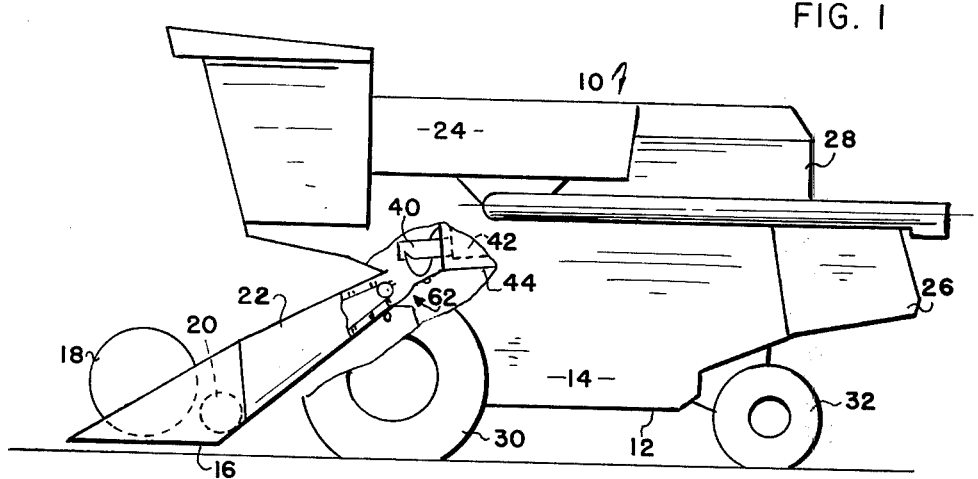

Referring now to the drawings, and particularly to FIG. 1, the combine 10 is generally of the type illustrated, for example, in said aforementioned U.S. Pat. Nos. 3,626,472 and 3,794,047. Said combine is of the axial flow type and includes a housing 12 in which the threshing and separating mechanism of the combine is included. Said housing is defined by opposite side plates 14. The forward end of the combine 10 has a header 16 detachably connected thereto for replacement by different types of crop cutting and converging mechanism. The header 16 shown in FIG. 1 also includes a reel 18 and a converging auger 20 which is at the forward end of the elevator 22 which is of the undershot type.

After the grain is threshed and separated within the housing 12, the grain is elevated by suitable means of conventional type to the grain bin 24 and the straw, vines and other waste material of the crop are discharged through the rear discharge compartment 26. All of the moving elements of the combine 10 are driven by an internal combustion engine within the engine compartment 28, said engine being of substantial horsepower and adapted not only to drive all of the moving components of the combine but also operating the drive wheels 30 of the combine which, together with the rear wheels 32, render the combine mobile.

Figure 2:
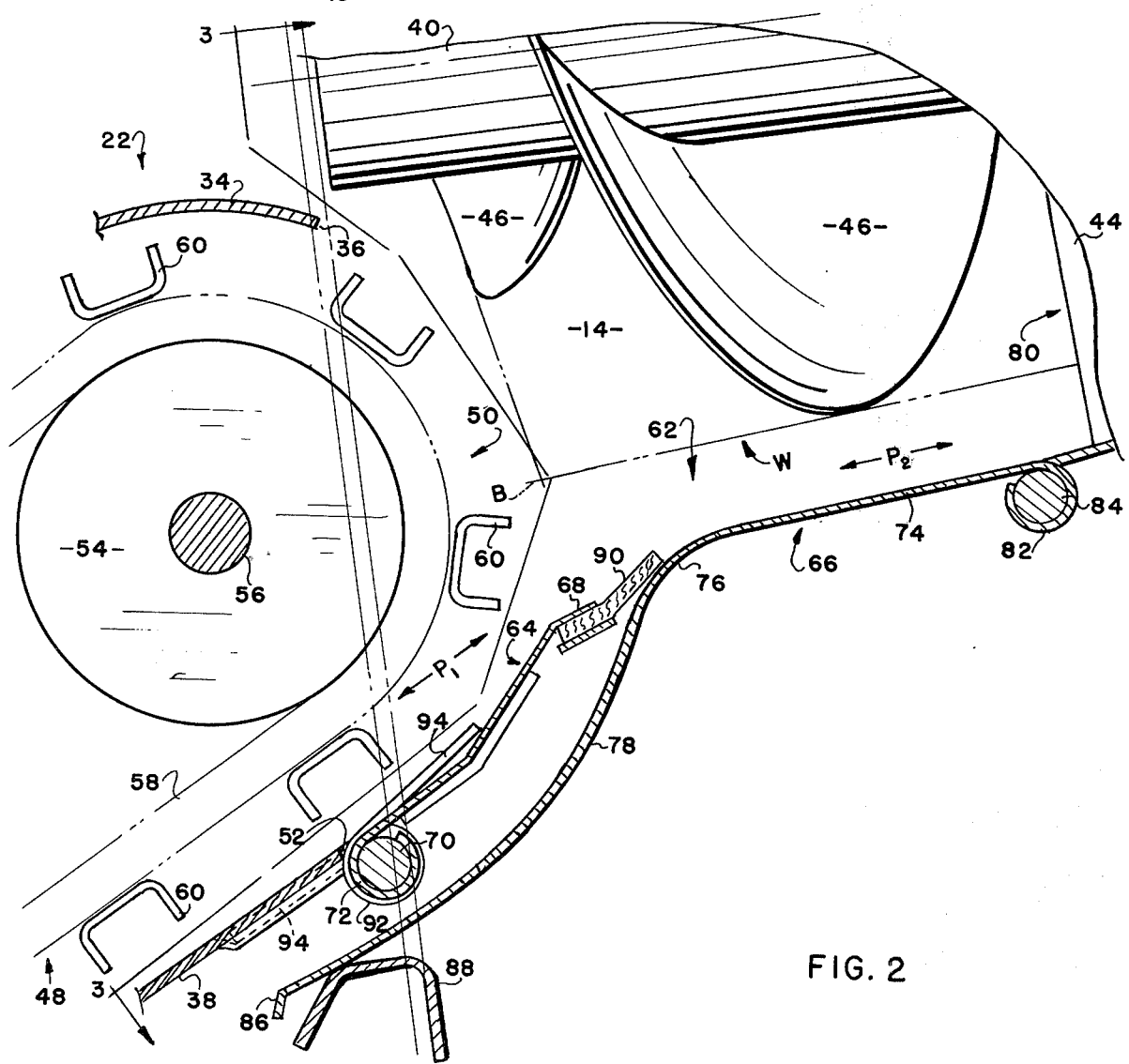

Referring to FIG. 2, it will be seen that the elevator 22 comprises an upper plate 34 which extends transversely across the entire width of the elevator and terminates in a rearwardly and downwardly curved extremity 36. The elevator 24 also includes a bottom wall or plate 38 which, as can be seen from FIG. 1, normally extends upwardly and rearwardly from the header 16 to an auger 40 mounted on the forward end of a rotor 42, the forward end of the latter being fragmentarily illustrated in FIG. 2. As can be seen from FIG. 3, in the preferred construction of the combine 10, there is a pair of augers 40 which are respectively operable adjacent the forward end of substantially cylindrical casings 44 which also enclose the rotors 42. The rotors 42 and casings 44 comprise coacting crop threshing and separating elements which, although not shown herein in detail, are shown in said aforementioned patents, to which attention is directed for further information on the same.

Figure 3:
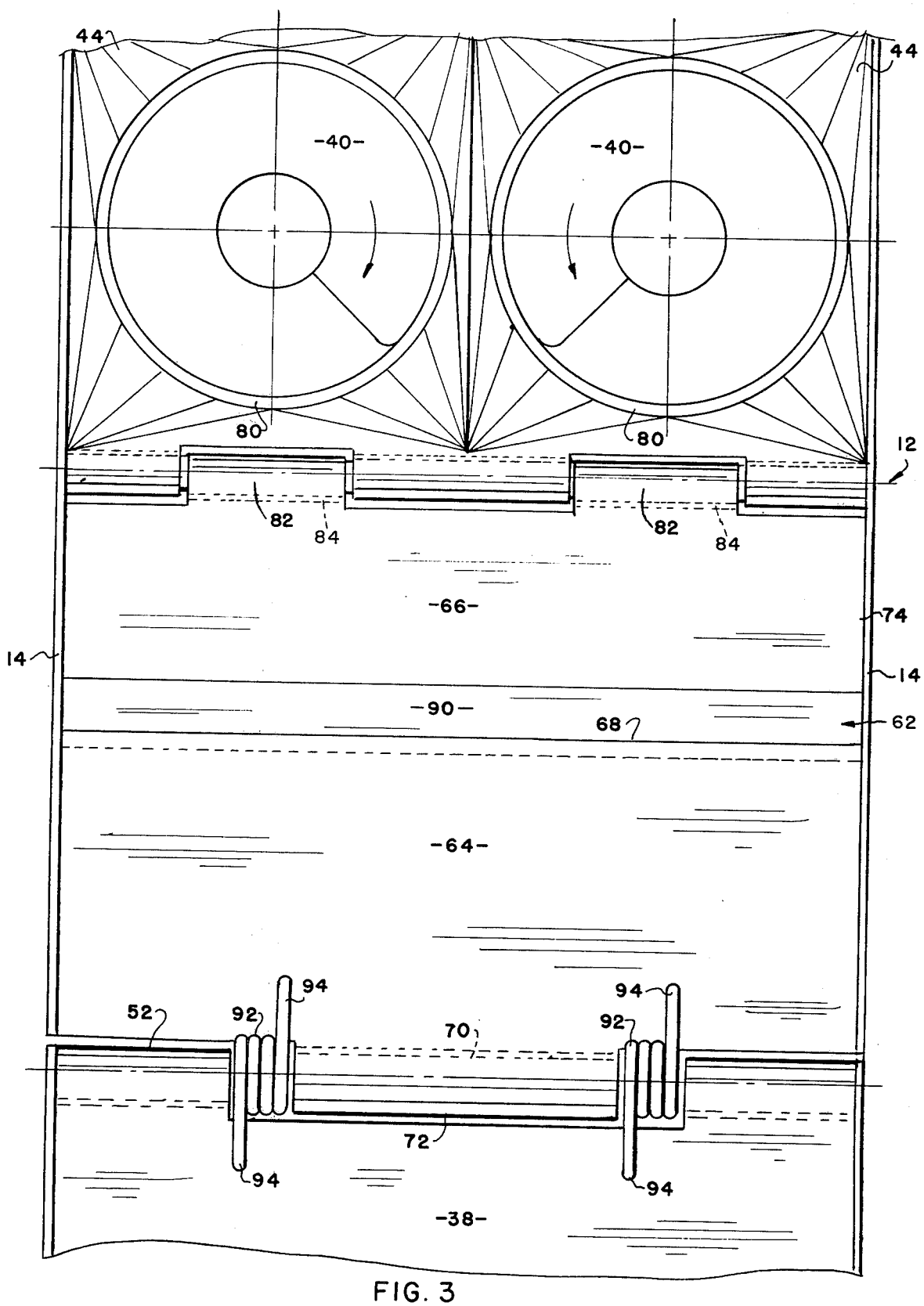

The power means within engine compartment 28 is suitably connected to the rear ends of the rotors 42 to drive the same and the augers 40 mounted to the forward ends thereof in opposite rotary directions, as indicated by the arcuate arrows on the rotors shown in FIG. 3. Also, the spiral flights 46 of the augers 40 respectively are spiralled in opposite direction so that when the rotors and augers are driven respectively in opposite rotary directions, as indicated in FIG. 3, the flights 46 of the augers 40 respectively will feed the crop material rearwardly to the rotors 42.

The elevator 22 also includes operable conveying means, generally designated by 48, disposed above the bottom wall or plate 38 and having a rear discharging portion 50 extending upwardly beyond an upper or terminal end 52 of the bottom wall 38 to adjacent the forward end of the auger flights 46 for conveying crop material rearwardly and upwardly along the bottom wall 38 to a discharge location above the terminal end 52 thereof and spaced below the forward end of the auger flights 46.

The conveying means 48 includes at opposite ends of the elevator 22 (only the upper end being shown in FIG. 2) a series of sprocket gears 54 mounted at laterally spaced locations upon transverse shafts 56 (only the upper gears and shaft being shown) and endless chains 58 which extend around the sprocket gears respectively at opposite ends of the elevator for purposes of supporting a series of longitudinally spaced, transversely extending elevator bars 60 which aggressively engage the crop material and slidably advanced the same along the bottom wall 38 to deliver the same in an undershot manner toward the lower portions of the augers 40. It will be seen in FIG. 2 that the upper end 52 of bottom wall 38 terminates adjacent the sprocket gears 48 (below the conveyor discharging portion 50) and therefore it is necessary to provide suitable feed or guiding means for the crop material beteween the upper or terminal end 52 of bottom wall 38 of the elevator and the forward ends of the rotors 42.

IMPROVED FEED RAMP MEANS

The improvement provided by the present invention comprises feed ramp means, generally designated as 62, for guiding crop material from the elevator 22 to the auger flights 46 and onto the rotors 42. Details of such improved feed ramp means are illustrated in FIGS. 2 and 3, said details and the function thereof being described as follows.

The means 62 includes a forward portion 64 and a rear portion 66. While the portions 64 and 66 are, preferably, separate elements as illustrated in FIG. 2, it is to be understood that the portions could be constructed as a single element.

The forward ramp portion 64 is in the form of a plate and, preferably, extends generally longitudinally aligned with, and forms an upward and rearward inclined extension of, the bottom wall 38 from the terminal or upper end thereof. In such arrangement, the plate 64 extends to an upper end 68 which is located generally rearwardly of, and in close proximity to, the lower boundary B of the working area (encompassed by broken line W) of the forward end of the flights 46 which comprise the crop material engaging structure of the feeding augers 40. Further, in such arrangement, the plate 64 is positioned in closely spaced relationship rearwardly of the conveyor discharging portion 50 and together therewith and with the forward end of the auger flights 46 defines an upward and rearward inclined forward passageway, indicated as $P_1$, for crop material from the upper or terminal end 52 of the bottom wall 38 to the auger flights 46. The plate 64 defines the lower boundary of the inclined forward passageway $P_1$, and will guide crop material from the upper end 52 of bottom wall 38 through forward passageway $P_1$ and into the working area of the auger flights 46 at the forward end thereof. In defining the lower boundary of passageway $P_1$ in close spaced proximity to the conveyor discharging portion 50, the plate 64, while so guiding the crop material, also postpones or delays the discharge of crop material by the conveyor discharging portion 50 until leading portions of the discharging crop material at least partially is engaged by the forward end of the auger flights 46. It is thus seen that positive control is maintained over the transfer of crop material from the elevator 22 to the augers 42, thereby eliminating the potential for crop material build-up in this critical infeed area.

The plate 64 transversely extends between opposite sides of the housing of elevator 22 of which bottom wall 38 is a part and between the side plates 14 of the combine. Preferably, the plate 64 is pivotally supported by transversely extending rod 70 around which a cylindrical lower end 72 of plate 64 extends. The rod 70 is preferably mounted to opposite side of the elevator housing. The pivotal mounting of the plate 64 allows it to generally maintain its desired longitudinally-extending position while accommodating vertical pivotal raising and lowering of the elevator 22. Alternatively, if plate 64 and ramp portion 66, which will be described hereinafter, were of one-piece structure, the lower end portion of the structure could be arranged to slide with respect to the bottom wall 38 to thereby accommodate pivotal movement of the elevator 22.

The rear ramp portion 66 is in the form of a plate which has a rearward generally planar part 74, a convex intermediate part 76 (as viewed from above plate 66) forming the forward edge of the rearward part 74 and a rearward and upward inclined concave forward part 78 (as viewed from above plate 66) which merges from the convex part 76. The plate 66 also extends between the opposite side plates 14 of the combine and the rear end of part 74 of the plate 66, which is adjacent a forward inlet opening 80 of casing 44, is connected by suitable hinge means 82 to a transversely extending pivotal means 84 which extends between the opposite side plates 14 of the combine housing. The lower forward end 86 of concave forward part 78 of the plate 66 is supported by a stationary transverse member 88 also connected to opposite side plates 14 of the combine housing.

It is seen that the planar part 74 of rear plate 66 is spaced below and extends generally parallel to the lower boundary B of the working area of auger flights 46. The forward edge of part 74, being constituted by intermediate convex part 76, is located rearwardly of, and in close proximity to the lower boundary of the working area of the forward end of the auger flights 46 and supports the upper end 68 of the plate 64 at such location. In such arrangement, the part 74 of plate 66 together with the auger flights 46 defines a rear passageway $P_2$ for crop material to the rotors 42 and casings 44. The part 74 of plate 66 defines the lower boundary of the rear passageway $P_2$ and will guide crop material through the rear passageway $P_2$ upon rotation of the augers 42. It is readily apparent that forward and rear passageways $P_1$, $P_2$ communicate with each other at the location of the forward edge of the part 74 of plate 66 and the upper end 68 of the plate 64.

In order that there will be no appreciable possibility for crop material to escape between the plates 64, 66, the present invention also, preferably, provides a compressible or yieldable sealing gasket strip 90, such as rubber or material similar in nature thereto, affixed to the underside of the upper end 68 of forward plate 64 and slidably abutting the upperside of the forward edge of the part 74 of the rear plate 66.

To insure maximum sealing effect by the plate 64 and strip 90, coiled portions of springs 92 are mounted about transverse rod 70, each having legs 94 on the opposite ends thereof which respectively abut the upper surfaces of forward plate 64 and bottom wall 38, as clearly shown in FIGS. 2 and 3, for the purpose of constantly biasing the upper end 68 of plate 64 and the strip 90 mounted thereon into firm engagement with the forward edge 76 of planar part 74 of rear plate 66. Actually, the spring legs 94 which engage the bottom wall 38 seat within recesses formed in the upper surface of the bottom wall, as seen in FIG. 2.

From the foregoing, it will be seen that the present invention provides relatively simple, very durable and highly effective feed ramp means for guiding crop material from the elevator of the combine to the forward ends of the feeding augers and onto the rotors which maintains continuous positive control over the crop material during transfer thereof from the elevator to the feeding augers.

While the invention has been described and illustrated in its preferred embodiment, it should be understood that the invention is not to be limited to the precise details herein illustrated and described since the same may be carried out in other ways falling within the scope of the invention as illustrated and described.

Having thus described the invention, what is claimed is:

1. In an axial flow combine having at least one axially arranged threshing and separating unit which includes elements arranged for coaction together to thresh and separate crop material and feeding means forwardly thereof having peripherally-arranged crop material engaging structure and being operable for feeding crop material to said threshing and separating elements, said combine further having means for elevating crop material from the field to said feeding means and being disposed generally forwardly of said threshing and separating unit, said elevating means including a bottom wall inclined upward and rearward and having an upper terminal end located in a position spaced below a forward end of said engaging structure of said feeding means and operable means disposed above said bottom wall and having a rear discharging portion extending upwardly beyond said terminal end of said bottom wall to adjacent said forward end of said engaging structure for conveying crop material rearwardly and upwardly along said bottom wall to a discharge location above said terminal end thereof and spaced below said forward end of said engaging structure, the improvement which comprises: feed ramp means for guiding crop material from said elevating means of said combine to said feeding means and then to said threshing and separating elements thereof, said feed ramp means including a forward portion which extends generally longitudinally from proximate said terminal end of said bottom wall to an upper end of said forward portion being spaced below, rearwardly of and in close proximity to, a lower boundary of the working area of said forward end of said engaging structure of said feeding means, said forward ramp means portion together with said discharging portion of said conveying means and said forward end of said engaging structure of said feeding means defining an upward and rearward inclined passageway for crop material from said terminal end of of said bottom wall to said engaging structure, said forward ramp means portion defining a lower boundary of said inclined passageway and being adapted to guide crop material from said terminal end of said bottom wall through said inclined passageway upon operation of said conveying means so as to postpone or delay the discharge of said crop material by said discharging portion of said conveying means until leading portions of said discharging crop material are at least partially engaged by said forward end of said engaging structure of said feeding means.

2. The combine according to claim 1, wherein said forward ramp means portion is longitudinally aligned with, and forms an upward and rearward inclined extension of, said bottom wall from said terminal end thereof.

3. The combine according to claim 1, wherein said feed ramp means further includes a rear portion which is spaced below said engaging structure of said feeding means and extends rearwardly to adjacent said threshing and separating elements, said rear feed ramp means portion having a forward edge being disposed adjacent said upper end of said forward ramp means portion.

4. The combine according to claim 3, wherein said rear feed ramp means portion together with said engaging structure of said feeding means defines a rear passageway for crop material to said threshing and separating elements, said rear feed ramp means portion defining a lower boundary of said rear passageway and being adapted to guide crop material through said rear passageway upon operation of said feeding means.

5. The combine according to claim 4, wherein said inclined passageway communicates with said rear passageway.

6. The combine according to claim 3, wherein said forward and rear feed ramp means portions are in the form of separate structural elemetns.

7. The combine according to claim 6, wherein said feed ramp means further includes means for maintaining said upper end of said forward feed ramp means portion in a sealed relationship with said forward edge of said rear feed ramp means portion.

8. The combine according to claim 7, wherein said forward feed ramp means portion is pivotally supported at a lower end adjacent said terminal end of said bottom wall and said maintaining means includes means operably associated with said forward ramp means portion to bias said upper end thereof into said sealed relationship with said forward edge of said rear feed ramp means portion.

9. The combine according to claim 8, wherein said bias means comprises spring means engaging said lower end of said forward feed ramp means portion and said terminal end of said bottom wall.

10. The combine according to claim 7, wherein said maintaining means includes yieldable material mounted to one of said upper end of said forward feed ramp means portion and said forward edge of said rear feed ramp means portion and engaged with the other to provide said sealed relationship therebetween.

* * * * *